(12) United States Patent
Vandapel et al.

(10) Patent No.: US 9,703,290 B1
(45) Date of Patent: Jul. 11, 2017

(54) METHOD FOR OPERATING MACHINES ON WORKSITES (71) Applicant: Caterpillar Inc., Peoria, IL (US)

(72) Inventors: Nicolas François-Xavier Christophe Vandapel, Pittsburgh, PA (US); Nicholas Chan, Pittsburgh, PA (US); Michael Karl Wilhelm Happold, Pittsburgh, PA (US); Andrew James Capodieci, Pittsburgh, PA (US); Meenal Patel, Pittsburgjh, PA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/043,520

(22) Filed: Feb. 13, 2016

(51) Int. Cl.
G05D 1/00 (2006.01)
G05D 1/02 (2006.01)
E21B 3/00 (2006.01)

(52) U.S. Cl.
CPC ............ G05D 1/0088 (2013.01); E21C 1/00 (2013.01); G05D 1/0246 (2013.01); *G05D 2201/021* (2013.01)

(58) Field of Classification Search
CPC ............... G05D 1/0088; G05D 1/0246; G05D 2201/021; E21C 1/00
USPC ......................................................... 701/28
See application file for complete search history.

(56) References Cited

U.S. PATENT DOCUMENTS

| | | |
|---|---|---|
| 5,954,143 A | 9/1999 | McCabe et al. |
| 6,047,227 A | 4/2000 | Henderson et al. |
| 6,151,539 A | 11/2000 | Bergholz et al. |
| 6,633,800 B1 * | 10/2003 | Ward .................... B60W 50/02 180/167 |
| 6,701,239 B2 | 3/2004 | Keefer |
| 8,315,838 B2 | 11/2012 | Durrant-Whyte et al. |
| 8,612,084 B2 | 12/2013 | Hennessy et al. |
| 9,481,977 B1 * | 11/2016 | Clar ........................ E02F 3/841 |
| 2004/0158355 A1 | 8/2004 | Holmqvist et al. |
| 2014/0074319 A1 | 3/2014 | McHugh et al. |
| 2016/0224026 A1 * | 8/2016 | Hamada ............... G05D 1/0011 |
| 2016/0238130 A1 * | 8/2016 | Ge ........................ F16H 61/42 |

FOREIGN PATENT DOCUMENTS

WO      2014187804      11/2014

* cited by examiner

Primary Examiner — Yazan Soofi (57) ABSTRACT

A method for operating a machine on a worksite is disclosed. The method includes detecting a forward worksite condition and a rearward worksite condition relative to the machine, respectively by a first image capturing module and a second image capturing module. Thereafter, the method includes determination of a measure of effect of the machine on the worksite by comparing the rearward worksite condition with the forward worksite condition. The measure of effect is one of a deviation of an actual machine path with a baseline operational path or an impression left by the machine on the worksite. Finally, controlling one or more parameters related to a movement of the machine over the worksite, based on the measure of effect, is carried out.

20 Claims, 4 Drawing Sheets

METHOD FOR OPERATING MACHINES ON WORKSITES

TECHNICAL FIELD

The present disclosure relates to the field of autonomous operation of machines on a worksite. More particularly, the present disclosure relates to the autonomous operation of a surface drill that is able to gauge an effect of its operation on the worksite and correct its associated operative parameters.

BACKGROUND

Several mining practices involve operations in unpredictable and dynamic work environments. Therefore, there is an ever-growing need to achieve higher safety in such practices. To this effect, the mining industry has postulated a mandate to only have minimum personnel physically attend and inspect an operation in situ. As a result, mining practices are increasingly becoming more and more reliant on the use of autonomous technology. Additionally, newer and stricter safety norms are being promulgated by several governments and federal agencies, world over.

Practices such as open-pit mining, which are performed in remote and potentially hazardous areas, make use of automated systems to carry out several conventional mining operations. Open-pit mining usually involves the use of large-sized, complex mining equipment, such as surface drills that involve complex machinery with integrated system architecture entwined with coherent component modules. Quantities of research and breakthrough in autonomous control of such machines in areas such as machine maneuver control, monitoring, localization, planning, navigation, and communication, accompanied with the desire to fulfil characteristic requirements of different worksites, have urged the industry to add further intelligence into such machines. Automation, accompanied with a requisite degree of efficiency and work output, is thus desirable in this field to achieve a desired output, with minimum manual intervention and a higher level of safety.

In open-pit mining, surface drills are applied to drill multi-meter-deep holes into the ground (generally referred to as a 'bench'). Drilled holes are subsequently filled with explosives and blasted so that material in the ground (or bench) can be removed. Positions of the drilled holes are generally meticulously planned in patterns according to a geology of the worksite. More particularly, drilled holes generally need to be appropriately or equally spaced apart and are to be aligned and formed along predefined directions. In operation, surface drills are mostly operated and maneuvered rigorously, and may undergo straight-line tramming, row shifting, three-point turning, etc. This is to ensure that at least a majority of drilled holes represent a relatively high level of geometric consistency. However, controlling the path of such machines on a bench accurately is a challenge as low level trajectories pertaining to the operational requirements need to be adjusted generally constantly to account for dynamic machine-ground interaction and the characteristic attributes (or limitations) of machine controllers. Such machine-ground interaction depends on the geometry of the worksite and on other environmental conditions. For example, the worksite may be inclined, undulated on certain portions, generally uneven, or may be soggy or wet, or may become muddy over a period, which may hinder an otherwise well-planned autonomous drilling exercise. To this end, no solution exists that helps the machine to counter and execute a corrective action to an inadvertent maneuver, based on the aforementioned conditions of the worksite, and return the machine to an intended path.

U.S. Pat. No. 6,633,800 ('800 reference) discloses a system and a method pertaining to a remote control of an underground mining vehicle (or simply a vehicle), which allows for manual, autonomous, and tele-operation, of the vehicle. Although the '800 reference discloses a vision based guidance system for autonomous operation of the vehicle, the vision based guidance system discusses usage of a light rope, which is used as a reference guide for a motion of the vehicle relative to a worksite. The '800 reference discusses no solution that would rectify and return a motion of the vehicle to an intended path that is based upon a condition of the worksite or an effect of the vehicle on the worksite.

Accordingly, the system and method of the present disclosure solves one or more problems set forth above and other problems in the art.

SUMMARY OF THE INVENTION

Various aspects of the present disclosure disclose a method for operating a machine on a worksite, the method includes detection of a forward worksite condition and a rearward worksite condition relative to the machine. The forward worksite condition is detected by a first image capturing module, while the rearward worksite condition is detected by a second image capturing module. Thereafter, the method includes determination of a measure of effect of the machine on the worksite by comparing the rearward worksite condition with the forward worksite condition. The measure of effect is one of a deviation of an actual machine path with a baseline operational path or an impression left by the machine on the worksite. Next, the method includes controlling one or more parameters related to a movement of the machine over the worksite, based on the measure of effect.

Certain aspects of the present disclosure disclose an assessment system for a machine operable on a worksite. The assessment system includes a first image capturing module configured to capture a forward worksite condition relative to the machine. A second image capturing module is configured to capture a rearward worksite condition relative to the machine. The assessment system also includes a controller. The controller is in communication with the first image capturing module and the second image capturing module. The controller is configured to determine a measure of effect of a movement of the machine on the worksite. This is ascertained by comparing the rearward worksite condition with the forward worksite condition, where the measure of effect is one of a deviation of an actual machine path with a baseline operational path or an impression left by the machine on the worksite. Based on the measure of effect, the controller is adapted to control one or more parameters of the machine, related to a movement of the machine over the worksite.

One aspect of the present disclosure discloses a machine that has a forward end, a rearward end, and one or more ground engaging traction devices. The machine is operable on a worksite and includes a first image capturing module that is arranged at the forward end. The first image capturing module is configured to capture a forward worksite condition relative to the machine. The machine includes a second image capturing module arranged at the rearward end of the machine. The second image capturing module is configured to capture a rearward worksite condition, relative to the machine. Further, a controller is provided which is in communication with the first image capturing module and the second image capturing module. The controller is configured to determine a measure of effect of a movement of the machine on the worksite by comparing the rearward worksite condition with the forward worksite condition. The measure of effect is one of a deviation of an actual machine path with a baseline operational path or an impression left by the machine on the worksite. Moreover, the controller is also configured to control one or more parameters related to a movement of the machine over the worksite, based on the measure of effect.

DETAILED DESCRIPTION

Figure 1:
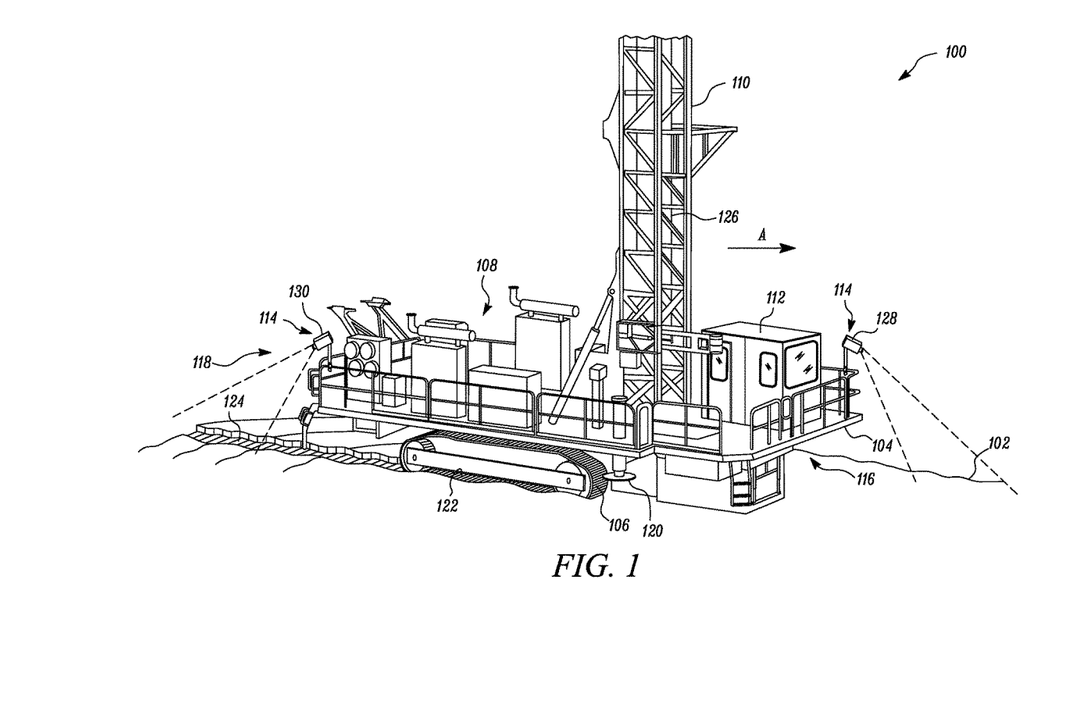
FIG. 1 illustrates an exemplary autonomous drilling machine, in accordance with the concepts of the present disclosure.

Referring to FIG. 1, an autonomous drilling machine (referred to as machine 100 hereinafter) is illustrated. The machine 100 may be one of a blast-hole drill, a rotary drill, a surface drill, etc., and may be a manually operated drilling machine or a semi-autonomous drilling machine, as conventionally known. In alternate embodiments, the machine 100 may embody other types of earth-working units that perform various operations at various worksites, such as a worksite 102. Accordingly, the machine 100 may be a track type machine, such as embodying one of hydraulic excavators, track-type tractors, skid-steer loaders, draglines, etc. Concepts of the present disclosure may be equivalently applicable to conventionally available wheeled machines as well, and such may include wheel loaders, backhoe loaders, etc. The worksite 102 may be a construction site or a mining site over which the machine 100 executes a drilling operation. In various other embodiments, the machine 100 may be a transportation machine that is able to transport excavated material from one location to another. For example, the machine 100 may be a mining truck, articulated truck, off-highway truck, etc. Further, an applicability of the aspects of the present disclosure may also be extended to vehicles and mobile units applied in various commercial and domestic establishments. Reference will now be made in detail to embodiments of the present disclosure, examples of which are illustrated in the accompanying drawings. Wherever possible, the same reference numbers will be used throughout the drawings to refer to the same or like parts.

The machine 100 includes a frame 104, ground engaging traction devices 106, an engine system 108, a mast 110, an operator cab 112, and one or more jack units 120. Further, the machine 100 includes a perception system or an assessment system 114 (best shown in FIG. 2) that helps the machine 100 assess or perceive conditions of a ground or the worksite 102 present around the machine's immediate vicinity, and take a corrective action based on a perceived or an assessed information. The machine 100 also includes a forward end 116 and a rearward end 118, generally defined along a direction of travel, A. For ease in referencing and understanding, further details of the assessment system 114 will be discussed in the description for FIG. 2.

The frame 104 generally forms a structural reference relative to which nearly every sub-structure and sub-system of the machine 100 is arranged. Accordingly, the frame 104 accommodates the engine system 108, the mast 110, the operator cab 112, and the jack units 120, although multiple other known components and structures may be supported by the frame 104, as well. The frame 104 plays a generally pivotal role in integrating and connecting various associated structural and functions parameters of the machine 100. The frame 104 is supported relative to the ground (or the worksite 102) on the ground engaging traction devices 106.

The ground engaging traction devices 106 may also be referred to as a transport mechanism of the machine 100, and may constitute a set of crawler tracks 122. Crawler tracks 122 may be configured to transport the machine 100 from one location to another. Generally, there are two crawler track units provided for the machine 100, with the each crawler track unit being suitably and individually provided on the respective sides of the machine 100, in a known manner. In certain implementations, the transport mechanism of the machine 100 may include wheeled units (not shown) as well. Wheeled units may be provided either in combination with the crawler tracks 122 or may be present on the machine 100 as stand-alone entities. The ground engaging traction devices 106 of the machine 100 are adapted to provide tractive force for the machine's movement over the worksite 102, and, in so doing, may leave characteristic tread marks or impression 124 on the worksite 102 during exemplary operations. Based on these tread marks or impression 124 (also classified as an effect of the machine 100 on the worksite 102), the machine 100 is provided with input facilitating correction of a maneuvering action of the machine 100, as will be elaborated further below.

The engine system 108 may be based on one of the commonly applied power-generation units, such as an internal combustion engine (ICE). The engine system 108 may include a V-type engine, in-line engine, or an engine with different configurations, as is conventionally known. Although not limited, the engine system 108 may be a spark-ignition engine or a compression ignition engine, which may be applied in construction machines, such as machine 100. However, aspects of the present disclosure, need not be limited to a particular engine type.

The mast 110 is mounted to the frame 104. The mast 110 is generally supported about a pivot point (not shown) relative to the frame 104 that allows for various manipulative configurations of the mast 110 relative to the machine 100. For example, a retracted or a bent configuration of the mast 110 allows the machine 100 to attain a compacted configuration and enables the machine 100 to be generally conveniently shipped or transported from one location to another. The mast 110 houses and supports a work tool or a ground engaging tool 126, such as a rotary head that may be raised and lowered by way of dual acting hydraulic cylinder feed system, as is customary. This provision enables the machine 100 to perform an exemplary drilling operation over the worksite 102. The ground engaging tool may be characteristic of a drill bit or a bore bit. In various embodiments, however, the ground engaging tool 126 may be one used to perform a variety of other operations as well. For example, the ground engaging tool 126 may include one or more of a blade, a shovel, a ripper, a dump bed, a fork arrangement, a broom, a grasping device, a cutting tool, a digging tool, a propelling tool, a bucket, a loader, or any other tool known in the art.

The operator cab 112 houses various components and controls of the machine 100 that are meant for the machine's movement and operation over the worksite 102. The operator cab 112 is also able to accommodate one or more operators during an operation of the machine 100, although it may be contemplated that the machine 100 being autonomous, is operable without the operator cab 112, as well. The operator cab 112 may include varying levels of automation, such as manual operation with operator assist systems, remotely operated, remotely supervised, or entirely autonomous systems. The operator cab 112 may include display units, control arms, levers, and steering mechanisms, (not shown) which correspond to various functionalities of the machine 100. Further, operator seating and stationing provisions, heating ventilation and cooling (HVAC) systems, and multiple other known provisions may be included within the operator cab 112 as well. Display units may be provided within the operator cab 112 to ascertain a visual data pertaining to a terrain in the immediate vicinity of the machine 100. Alternatively, display units may be provided remotely to enable operators, supervisors, site inspectors, and even automated controllers of the machine 100, to monitor a pace and a nature of the machine's operation over the worksite 102.

Further, the machine 100 includes jack units 120 that may be extended generally downwardly relative to the machine 100, and pushed against an underlying ground (worksite 102) to stabilize and level the machine 100 during operations. In a general implementation of the present disclosure, there are a set of four jack units 120 provided for the machine 100. This set is generally laid out in a four-cornered, rectangular configuration, although various other configuration, such as those having six jack units, eight jack units, etc., laid out in various orientations and arrangements, may be contemplated. During a movement of the machine 100, these jack units 120 may be retracted so as not to obstruct the motion of the machine 100.

Figure 2:
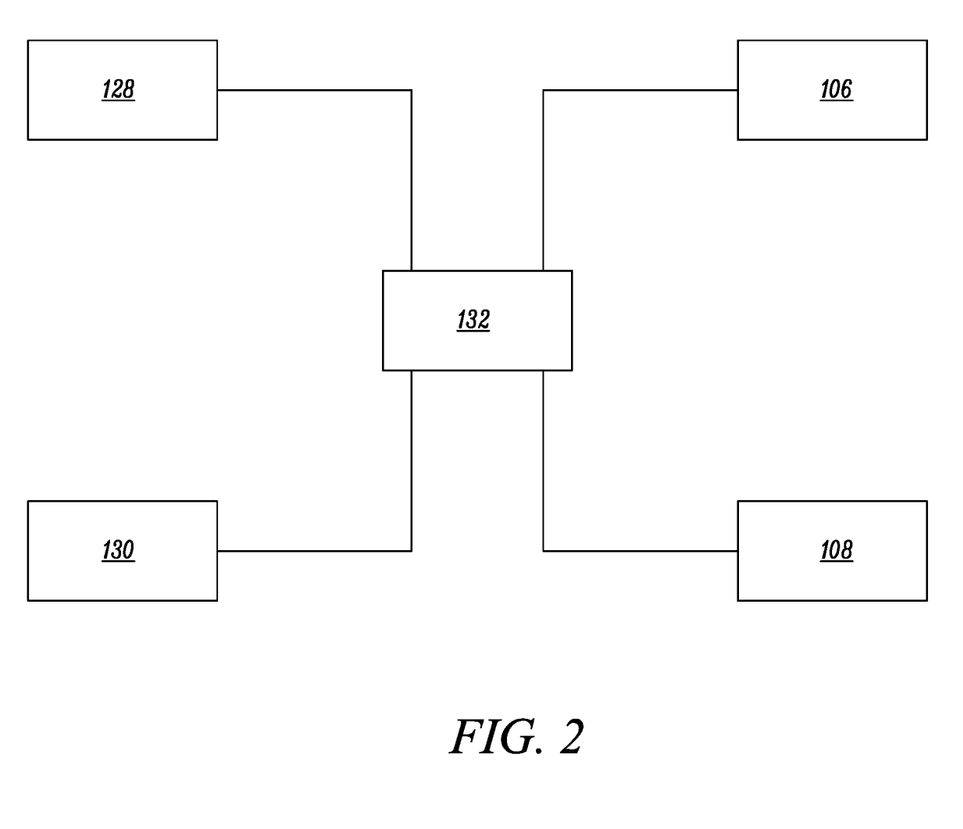
FIG. 2 illustrates a schematic view of an assessment system installed in the autonomous drilling machine of FIG. 1, in accordance with the concepts of the present disclosure.

Referring to FIGS. 1 and 2, the machine 100 includes twin image capturing modules, categorized into a first image capturing module 128 and a second image capturing module 130. The first image capturing module 128 is positioned at the forward end 116 of the machine 100, while the second image capturing module 130 is positioned at the rearward end 118 of the machine 100 (FIG. 1). Both the first image capturing module 128 and the second image capturing module 130 are part of the assessment system 114 (best shown in FIG. 2) of the machine 100. In an embodiment, twin image capturing modules 128, 130 of the assessment system 114 are one of a light detection and ranging (LIDAR) system, a mono camera module, a stereo camera module, or a three-dimensional (3D) radar module, or a combination of these.

Referring to FIG. 2, an exemplary schematic of the assessment system 114 is shown. The assessment system 114 helps the machine 100 analyze a condition of the ground (or worksite 102) and determine an effect of the machine 100 on the worksite 102, as the machine 100 traverses over the worksite 102 during operations. In addition, the assessment system 114 helps the machine 100 take certain corrective actions based on the effect analyzed or a perceived data. As already noted, the assessment system 114 is inclusive of both the first image capturing module 128 and the second image capturing module 130. Further, the assessment system 114 includes a controller 132 as well. The assessment system 114 also incorporates a connection of the controller 132 to the ground engaging traction devices 106 and the engine system 108, although various other sub-systems of the machine 100 may be connected to the controller 132 as well.

The first image capturing module 128 is able to capture a forward worksite condition 134 (best shown in FIG. 3) relative to the machine 100. Similarly, the second image capturing module 130 is able to capture a rearward worksite condition 136 (best shown in FIG. 3) relative to the machine 100. Collectively, the first image capturing module 128 and the second image capturing module 130 may be referred to as image capturing modules 128, 130. The image capturing modules 128, 130 may be a Light Detection and Ranging (LIDAR) based system, while it is also possible that the image capturing modules 128, 130 respectively embody a forward facing camera and rearward facing camera, and which capture the forward worksite condition 134 and a rearward worksite condition 136. In certain other embodiments, the image capturing modules 128, 130 embody three dimensional (3D) sensors adapted to interpret a 3D scene relative to a field of view. The image capturing modules 128, 130 may be powered by way of a power supply, perhaps derived from a main power supply of the machine 100.

A LIDAR system applied for the image capturing modules 128, 130 may facilitate automated interpretation of 3D scenes, representing and deciphering the forward worksite condition 134 and the rearward worksite condition 136. With a LIDAR based system it is possible to detect, segment, and recognize features of the forward worksite condition 134 and the rearward worksite condition 136. Features of the worksite 102 may generally include obstructions, terrain texture, auxiliary vehicles, personnel, and other objects. Additionally, certain ground conditions, surface roughness, terrain fidelity, and terrain geometry, may be analyzed as well. With LIDAR based systems a single transmitted beam may capture a 3D array of distance points, covering a 360° viewing angle, and by having the first image capturing module 128 and the second image capturing module 130 positioned relative to the machine 100, it is possible to scan the worksite conditions in 3D before and after traversing it. Moreover, it is possible to observe, reconstruct, and estimate, further changes that may be sustained by the worksite 102 based on the analyzed conditions. Therefore, the image capturing modules 128, 130 provide a real time analysis and information about the effect of the machine 100 over the worksite 102, allowing the controller 132 to optimally control certain parameters related to the movement of the machine 100. Effectively, the 3D LIDAR based image capturing modules 128, 130 are able to scan their surrounding environment to obtain a series of 3D point clouds.

Structurally, the 3D LIDAR based image capturing modules 128, 130 may include a plurality of light sources, such as lasers. Each laser may generate a laser beam which is directed at various points of the worksite 102 (generally an immediate ground portion both forward and rearward of the machine 100). The image capturing modules 128, 130 may further include one or more detector devices that receive the laser beams after reflection off from various points of the worksite 102. Based on an associated time lag between the generation of the laser beam and receipt of the reflected laser beam (referred to as time-of-flight measurements), the LIDAR based image capturing modules 128, 130 may determine a distance of the machine 100 (or a portion of the machine 100) to the corresponding detected point. In such a manner, the image capturing modules 128, 130 may generate a 3D point cloud image representative at least of a part of the worksite 102. Each data point in this 3D point cloud image may include and represent a distance, terrain type, etc., from the image capturing modules 128, 130 to a detected point of the worksite 102. Once a series of such 3D point clouds are obtained, from both the first image capturing module 128 and the second image capturing module 130, a signal is generated so that an effect of the machine 100 on the worksite 102 may be eventually obtained.

In some embodiments, the image capturing modules 128, 130 include one or more of the forward facing cameras and the rearward facing cameras, as aforementioned, suitably positioned to scan a forward terrain (forward worksite condition 134) and a rearward terrain (rearward worksite condition 136). Individually, each of the first image capturing module 128 and the second image capturing module 130 may include more than one camera. Such camera(s) in the image capturing modules 128, 130 may include pan, tilt, and zoom capability that allow a capture of characteristic features of the worksite 102. Cameras in the image capturing modules 128, 130 may include a transceiver or a modem coupled with the controller 132 so as to transmit a detected signal to the controller 132 either wirelessly or through a cabled link. In the wired mode or when having cabled links, the image capturing modules 128, 130 may support an Ethernet connection/communication, while in the wireless mode, the image capturing modules 128, 130 may support and transmit data through a plurality of wireless protocols, including Wi-Fi, Bluetooth, and ZigBee protocols.

In some embodiments, cameras within the image capturing modules 128, 130 may include a mono camera module, with one or more mono cameras, or a stereo camera module, with one or more stereo cameras. The cameras may be connected to intermediately or integrally positioned data processing units (not shown) that are able to analyze the captured images or a perception data and convert the captured images into processed data which is readable by the controller 132. In such instances, a signal from the data processing units may be transmitted to the controller 132, representing a video signal generated by the camera, and thereby, indicating a 'change' a 'degree of change' or 'no change' occurred over the traversed worksite 102. Optionally, the cameras within the image capturing modules 128, 130 may also include an alert transducer system or annunciator that would help detect said signals based on a preset frequency or time interval.

In still some embodiments, the image capturing modules 128, 130 includes a set of 3D sensors or perception sensors, such as a 3D scanner and/or a 3D radar that are adapted to analyze a real-world environment, such as those found on the worksite 102. This is to collect a data on a shape, texture, geometry, and possibly, even a color of the worksite 102 or terrain. The collected data can then be used to construct a digital three-dimensional model, based on which it is possible to gauge a current effect, and a future effect of the machine 100 over the worksite 102. However, it will be understood by one of ordinary skill in the art that the disclosed exemplary embodiments could be modified to utilize other 3D scanning devices, as well.

Generally, it is also possible that the image capturing modules 128, 130 include additional video cameras and 3D sensors, or sensors such as proximity sensors, to overcome blind spots and/or to provide a depth of field that enables the controller 132 to receive and analyze the distance and an extent to which the worksite 102 around the machine 100 has sustained change, pursuant to the machine 100's operation.

The controller 132 may be located in the operator cab 112, although various other positions of the controller 132 may be contemplated, such as the controller 132 may be positioned and connected to other control units within the operator cab 112. The controller 132 is connected to both the first image capturing module 128 and the second image capturing module 130. The controller 132 is configured to receive visually detected signals or a perception data from the first image capturing module 128 and the second image capturing module 130. The controller 132 is also connected to several devices and sub-systems of the machine 100 by which the controller 132 is able to control one or more parameters of said sub-systems relative to the machine 100. For example, the controller 132 is connected to the ground engaging traction devices 106 and the engine system 108. Therefore, various machine parameters such as torque, turning radius, yaw, roll, pitch, and other related a machine movement, may be monitored and obtained by the controller 132, and further optimized so as to correct a way of the machine 100's working. To this end, the controller 132 is connected with the ground engaging traction devices 106 so as to facilitate a change in torque, perhaps on one side of the machine 100 relative to the other, but depending upon an effect of the machine 100 on the worksite 102. In that manner, it is possible to attain a smaller turning radius of the machine 100, for example, helping the machine 100 execute tighter turns to comply an actual machine path of the machine 100 with an intended baseline operational path. The baseline operational path may be a preset map stored in a memory of the controller 132. The controller 132 may also be connected to the ground engaging tool 126 and other sub-systems of the machine 100, such as the machine's power source (engine system 108) to vary a fuel intake, for example, so as to deliver a higher or a lower power output.

The controller 132 may be a microprocessor-based device, which subsequent to the receipt of signal from the image capturing modules 128, 130, processes and converts the signal into a data with a feedback-specific format. This data corresponds and is required to a compute a measure of effect of machine 100 over the worksite 102, and which post-processing is compatible for a delivery and use with the one or more of the sub-systems of the machine 100 that serve as generally pertinent parameters to enable, restrict, or alter, a machine movement. In general, the measure of effect is a deviation of the actual machine path from an intended path (referred to as the baseline operational path). It may also be possible that a measure of effect is computed based on the impression 124 left by the machine 100 over the worksite 102.

To compute a measure of effect of the machine 100 on the worksite 102, the controller 132 is provided with an algorithm that receives input from the image capturing modules 128, 130 as deterministic values. These values are further processed to impart an assessment to the effect sustained. More particularly, impression 124 left by the machine 100 over the worksite 102 includes tread marks of the ground engaging traction devices 106 over the worksite 102. Track marks (at the rearward worksite condition 136, FIG. 3) may be detected by the second image capturing module 130, for example, and scaled according to the algorithm provided within the controller 132 to generate a rear worksite value. Simultaneously, the first image capturing module 128 is adapted to detect the forward worksite condition 134 and scale the associated data to generate a forward worksite value. A comparison and determination between the forward worksite value and the rearward worksite value also corresponds to segmenting, differentiating, and recognizing the rearward worksite condition 136, from the forward worksite condition 134. Thereafter, the rearward worksite value is compared with the forward worksite value, and an assessment data is generated. Notably, such a comparison and the assessment data is associated with a change sustained by the worksite 102 because of the machine 100.

Further, the controller 132 is also able to determine and reconstruct a possible future terrain geometry based on the assessment data. Depending on the assessment data, therefore, the controller 132 is configured to determine a decisive data that corresponds to the future geometry of the worksite 102. Eventually, the controller 132 is configured to determine a measure of effect by comparing the assessment data with the decisive data.

A measure of deviation from an intended path (baseline operational path) may be determined based upon a plurality of physically pre-determined reference points provided over or relative to the worksite 102, for example. Therefore, it is also possible for the controller 132 to store a set of reference or two dimensional co-ordinates based on which the machine 100 is configured to move over the bench (worksite 102). As soon as there is a deviation detected (by either of the first image capturing module 128 or the second image capturing module 130) relative to the set of reference or two dimensional co-ordinates, a signal is sent to the controller 132 for necessitating corrective action. Nevertheless, it is also contemplated that such reference points are provided virtually and both the image capturing modules 128, 130 may detect these based upon geographical co-ordinates provided probably by an in-built or a remotely positioned global positioning system of the machine 100.

The controller 132 may include a set of volatile memory units such as random access memory (RAM) and read-only memory (ROM), which include associated input and output buses. The controller 132 may store multiple values associated with thresholds of a parameter breach, based on which one or more corrective action is taken. In an embodiment, the controller 132 may include a model associated with a parameter breach, based on which the controller 132 initiates and performs one or more corrective action. The controller 132 may be envisioned as an application-specific integrated circuit, or other logic devices, which provide controller functionality, and such devices being known to those with ordinary skill in the art. In an exemplary embodiment, the controller 132 may form a portion of one of the machine's electronic control unit (ECU), such as a safety module or a dynamics module, or may be configured as a stand-alone entity. The controller 132 may be configured into the machine 100's dashboard to impart functionality, accessibility, and service convenience. Further exemplary arrangements may include the controller 132's accommodation within other machine panels or portions from where the controller 132 remains accessible for ease of use, maintenance, and repairs.

Figure 3:
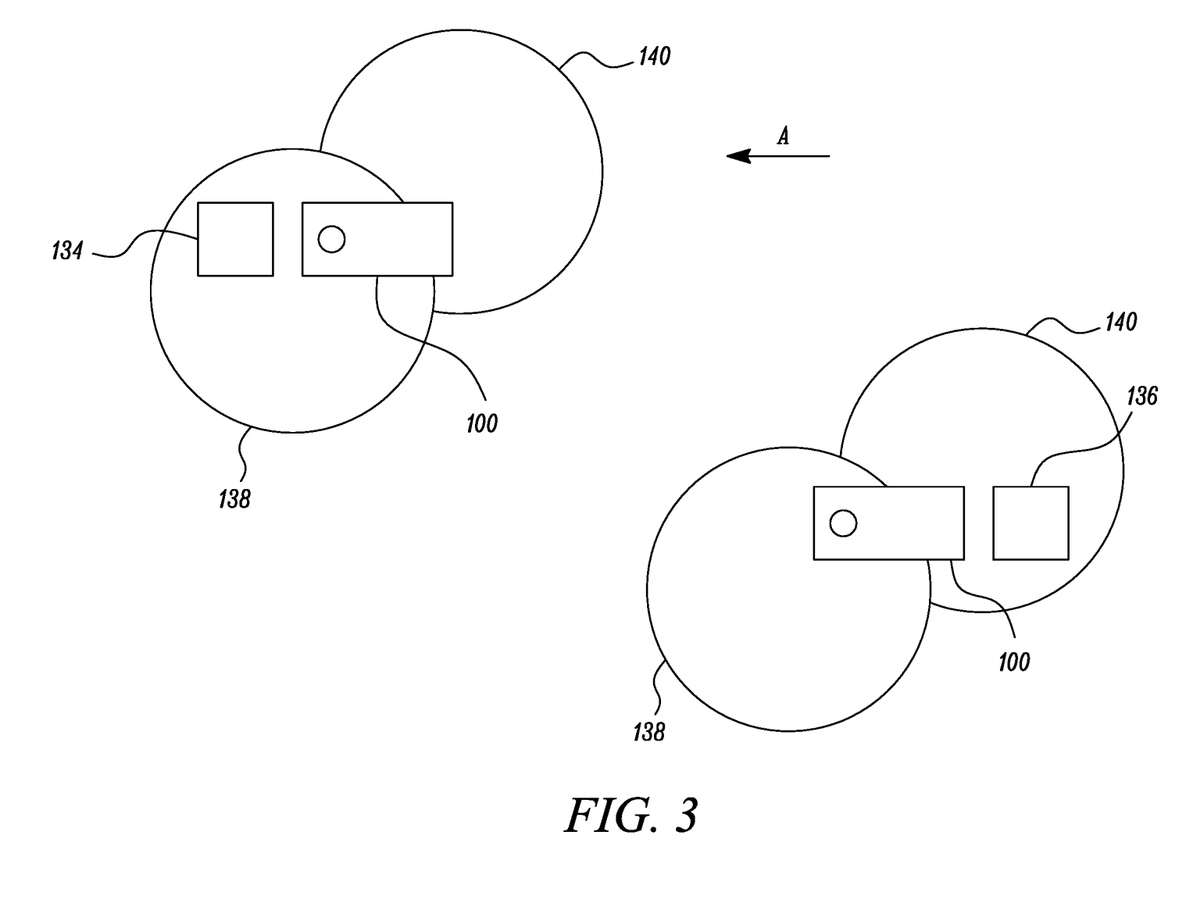
FIG. 3 is an operational schematic depicting an exemplary working of the autonomous drilling machine of FIG. 1, in accordance with the concepts of the present disclosure.

Referring to FIG. 3, an exemplary layout and plan of the working aspects of the machine 100 is provided. FIG. 3 is generally schematic in nature. The machine 100 is operable along the direction A (also in FIG. 1). The first image capturing module 128 is envisioned to capture a field of view 138, generally forward to the machine 100 and relative to a direction of travel, A. Similarly, the second image capturing module 130 is set to capture a field of view 140, generally rearward to the machine 100 and relative to the direction of travel, A. In so doing, the image capturing modules 128, 130 envisages a 360° perception system or assessment system 114. Therefore, the field of view 138 corresponds and encompasses the forward worksite condition 134, while the field of view 140 corresponds and encompasses the rearward worksite condition 136. An alignment of both field of views 138, 140 is depicted as being be at an angle relative to the direction of travel, A. This is because a positioning of the first image capturing module 128 relative to the second image capturing module 130 is generally diagonally configured because of spatial and positional constraints of the machine 100. However, this arrangement may be varied and the field of views 138, 140 may be aligned generally in line with the direction of travel, A, as well.

Figure 4:
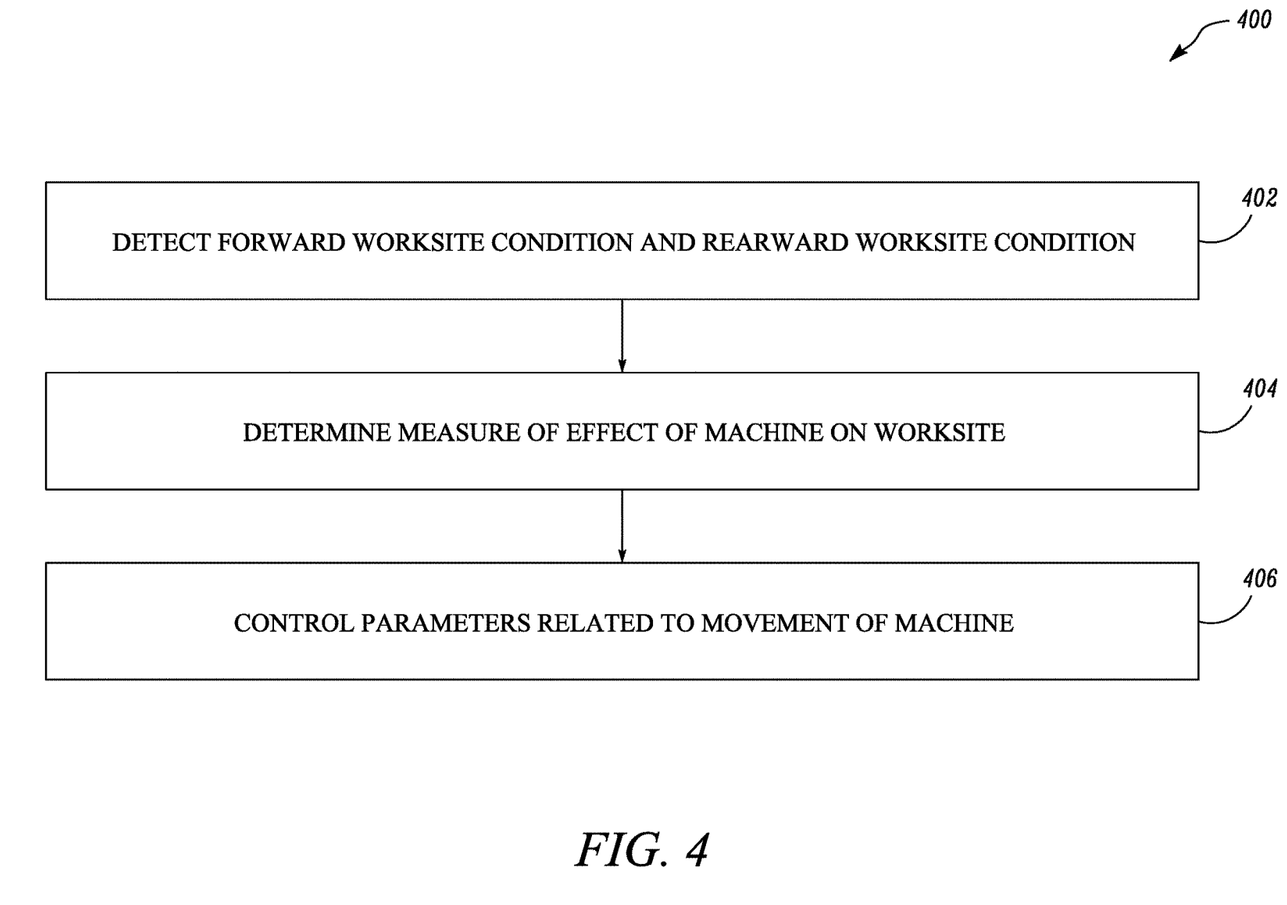
FIG. 4 is a flow chart illustrating an exemplary method of the assessment system, in accordance with the concepts of the present disclosure.

Referring to FIG. 4, an exemplary method of operation of the machine 100 over the worksite 102 by the assessment system 114 is set out. The method is explained by way of a flowchart 400 and is discussed in conjunction with FIGS. 1, 2, and 3. The method initiates at step 402.

At step 402, the first image capturing module 128 detects a forward worksite condition 134, while the second image capturing module 130 detects a rearward worksite condition 136. Both the forward worksite condition 134 and the rearward worksite condition 136 are determined or detected relative to the machine 100. The method proceeds to step 404.

At step 404, the controller 132 determines a measure of effect of the machine's movement over the worksite 102. This determination is performed by comparing the signals received from the second image capturing module 130 with the first image capturing module 128. Further, the comparison process is inclusive of segmenting and differentiating between the rearward worksite condition 136 and the forward worksite condition 134. In one implementation, the controller 132 may be provided with one or more image analyzers that enable the recognition and differentiation of various features of the worksite 102. Moreover, determination by the controller 132 also includes reconstruction and estimation of the changes in the worksite 102 as a result of the movement of the machine 100 over the worksite 102. Further, as aforementioned, the measure of effect corresponds to either one or both of a deviation of an actual machine path with a baseline operational path or an impression left by the machine 100 on the worksite 102. The method proceeds to step 406.

At step 406, the controller 132 receives the signals as detected by the first image capturing module 128 and the second image capturing module 130 and executes correction of one or more parameters of the machine 100 related to a movement of the machine 100, based on the measure of effect. Corrective action may include at least one of adjusting a torque to one of the ground engaging traction devices 106 of the machine 100.

INDUSTRIAL APPLICABILITY

During operations, as the machine 100 traverses over the worksite 102, it is possible that the machine 100 leaves behind characteristic marks (or impression 124) of the crawler tracks 122 behind. If the worksite 102 is muddy, the impression 124 may be more prominent and it may happen that an actual machine path deviates from a baseline operational path owing to the slushy conditions. Such a situation worsens if the worksite 102 is at an incline, as there is an increased chance for the machine 100 to drift considerably away from an intended path, perhaps owing to gravity. A muddy worksite 102, for example, ascertains that the crawler tracks 122 of the machine 100 may leave behind an entrenched mark, which is relatively deeply sustained by the portion of the worksite 102 traversed by the machine 100, compared to the rest of the surrounding. The second image capturing module 130 detects this event as the rearward worksite condition 136, while the first image capturing module 128 determines the forward worksite condition 134 as a general, naturally occurring surrounding worksite condition. Each of the first image capturing module 128 and the second image capturing module 130 generates a data (or signal) corresponding to the detected rearward worksite condition 136 and the forward worksite condition 134. As the entrenched state of the rearward worksite condition 136 is different from the forward worksite condition 134, the controller 132 recognizes and differentiates the two, and subsequently determines an assessment data related to a traversal effect of the machine 100. Thereafter, the controller 132 also generates a decisive data based on a reconstructed and estimated future condition of the worksite 102. The controller 132 then compares the assessment data with the decisive data to deduce a measure of effect of the machine 100 over the worksite 102. Pursuant to the determination of the measure of effect, the controller 132 initiates control of one or more aspects or parameters of the machine 100. These parameters of the machine 100 are related to a movement of the machine 100, thereby facilitating compliance of the actual machine path machine to the baseline operational path.

In some embodiments, controlling parameters of the machine 100 corresponds to adjusting a turning radius of the machine 100. This is facilitated by providing additional torque to one of the ground engaging traction devices 106 over the other. In further implementations, controlling parameters of the machine 100 may include controlling a power delivery to the engine system 108 for movement of the machine 100. In one implementation, the parameter is associated with controlling or adjusting the jack units 120 and one or more ground engaging tools, such as ground engaging tool 126, of the machine 100. For example, the controller 132 may raise the ground engaging tool 126 or the jack units 120 if it is detected that a position of the ground engaging tool 126 may hinder the movement of the machine 100.

The controller 132 also determines the measure of effect of the machine 100 by distinguishing and assessing a requirement to correct the actual machine path to the baseline operational path. In an implementation, the image capturing modules 128, 130 may detect certain physically laid out markers that generally allow the machine 100 to run over a predetermined course. A deviation of the actual machine path from the physically laid out markers denotes a deviation from the intended path, urging the controller 132 to compute values pertaining to a degree of deviation. Based on the value calculated for the degree of deviation, the controller 132 signals one or more parameters, such as the ground engaging traction devices 106 to provide additional torque on one side of the machine 100, enabling the machine 100 to return to the originally intended, baseline operational path.

Optionally, the controller 132 is connected to the other sub-systems such as the ground engaging tool 126 and the jack units 120, as well so as to control operations of the ground engaging tool 126 and the jack units 120. This ensures that the ground engaging tool 126 and the jack units 120 are prevented from an undue ground contact if there is a detection of an entrenched and slushy rearward worksite condition 136, and which possibly could sway the machine 100 away from the baseline operational path.

The assessment system 114 may also be provided as a kit of parts, so as to enable retrofitting and aftermarket fitment of the assessment system 114 to multiple machines. Therefore, it is possible that the assessment system 114 is applicable on multiple machines, such as the machine 100, and for varying worksite conditions. For this purpose, the controller 132 may be configured to be maintained as a stand-alone entity, and it may be possible to provide periodic controller updates, additional software installations according to different worksite conditions, etc.

It should be understood that the above description is intended for illustrative purposes only and is not intended to limit the scope of the present disclosure in any way. Thus, one skilled in the art will appreciate that other aspects of the disclosure may be obtained from a study of the drawings, the disclosure, and the appended claim.

What is claimed is:

1. A method for operating a machine on a worksite, the method comprising:
   detecting a forward worksite condition and a rearward worksite condition relative to the machine, respectively by a first image capturing module and a second image capturing module;
   determining a measure of effect of a movement of the machine on the worksite by comparing the rearward worksite condition with the forward worksite condition;
      wherein the measure of effect is one of a deviation of an actual machine path with a baseline operational path or an impression left by the machine on the worksite; and
   controlling one or more parameters related to the movement of the machine over the worksite, based on the measure of effect.

2. The method of claim 1, wherein comparing the rearward worksite condition with the forward worksite condition corresponds to segmenting and recognizing a terrain traversed by the machine.

3. The method of claim 1, wherein determining the measure of effect includes reconstructing and estimating changes in the worksite as a result of the movement of the machine over the worksite.

4. The method of claim 1, wherein controlling one or more parameters of the machine based on the measure of effect facilitates compliance of the actual machine path with the baseline operational path.

5. The method of claim 1, wherein controlling one or more parameters corresponds to adjusting one or more ground engaging tools of the machine.

6. The method of claim 1, wherein controlling one or more parameters corresponds to adjusting a turning radius of the machine.

7. The method of claim 1, wherein the impression left by the machine is caused by one or more ground engaging traction devices of the machine.

8. An assessment system for a machine, the machine operable on a worksite, the assessment system comprising:
   a first image capturing module configured to capture a forward worksite condition relative to the machine;
   a second image capturing module configured to capture a rearward worksite condition relative to the machine; and
   a controller in communication with the first image capturing module and the second image capturing module, the controller configured to:
      determine a measure of effect of a movement of the machine on the worksite by comparing the rearward worksite condition with the forward worksite condition, wherein the measure of effect is one of a deviation of an actual machine path with a baseline operational path or an impression left by the machine on the worksite; and control one or more parameters related to the movement of the machine over the worksite, based on the measure of effect.

9. The system of claim 8, wherein the controller facilitates compliance of the actual machine path with the baseline operational path, based on the measure of effect.

10. The system of claim 8, wherein the first image capturing module is a forward facing camera and the second image capturing module is a rearward facing camera, relative to the machine.

11. The system of claim 8, wherein the machine includes a forward end and a rearward end, and the first image capturing module is mounted to the forward end and the second image capturing module is mounted to the rearward end.

12. The system of claim 8, wherein the first image capturing module and the second image capturing module are three dimensional sensors adapted to interpret a scene according to a field of view.

13. The system of claim 8, wherein the first image capturing module and the second image capturing module are one of a light detection and ranging (LIDAR) system, a mono camera module, a stereo camera module, a three-dimensional radar module, or a combination thereof.

14. The system of claim 8, wherein controlling the one or more parameters include adjusting one or more ground engaging tools of the machine.

15. The system of claim 8, wherein controlling the one or more parameters include adjusting a turning radius of the machine.

16. A machine having a forward end, a rearward end, and one or more ground engaging traction devices, the machine being operable on a worksite, the machine comprising a first image capturing module arranged at the forward end to capture a forward worksite condition relative to the machine;

a second image capturing module arranged at the rearward end to capture a rearward worksite condition relative to the machine; and a controller in communication with the first image capturing module and the second image capturing module, the controller configured to:

determine a measure of effect of a movement of the machine on the worksite by comparing the rearward worksite condition with the forward worksite condition, wherein the measure of effect is one of a deviation of an actual machine path with a baseline operational path or an impression left by the machine on the worksite; and control one or more parameters related to the movement of the machine over the worksite, based on the measure of effect.

17. The machine of claim 16, wherein the first image capturing module and the second image capturing module are one of a light detection and ranging (LIDAR) system, a mono camera module, a stereo camera module, a three-dimensional radar module, or a combination thereof.

18. The machine of claim 16, wherein the first image capturing module is a forward facing camera and the second image capturing module is a rearward facing camera.

19. The machine of claim 16, wherein comparing the rearward worksite condition with the forward worksite condition corresponds to segmenting and recognizing a terrain traversed by the machine, and the impression left by the machine on the worksite.

20. The machine of claim 16, wherein controlling one or more parameters includes controlling a turning radius of the machine.

* * * * *